C. W. DAVISON, W. HERRIOT, E. T. SPIDY & F. A. MATTSON.
SHOCKING MACHINE.
APPLICATION FILED MAY 9, 1913.
1,103,273.
Patented July 14, 1914.
4 SHEETS—SHEET 3.
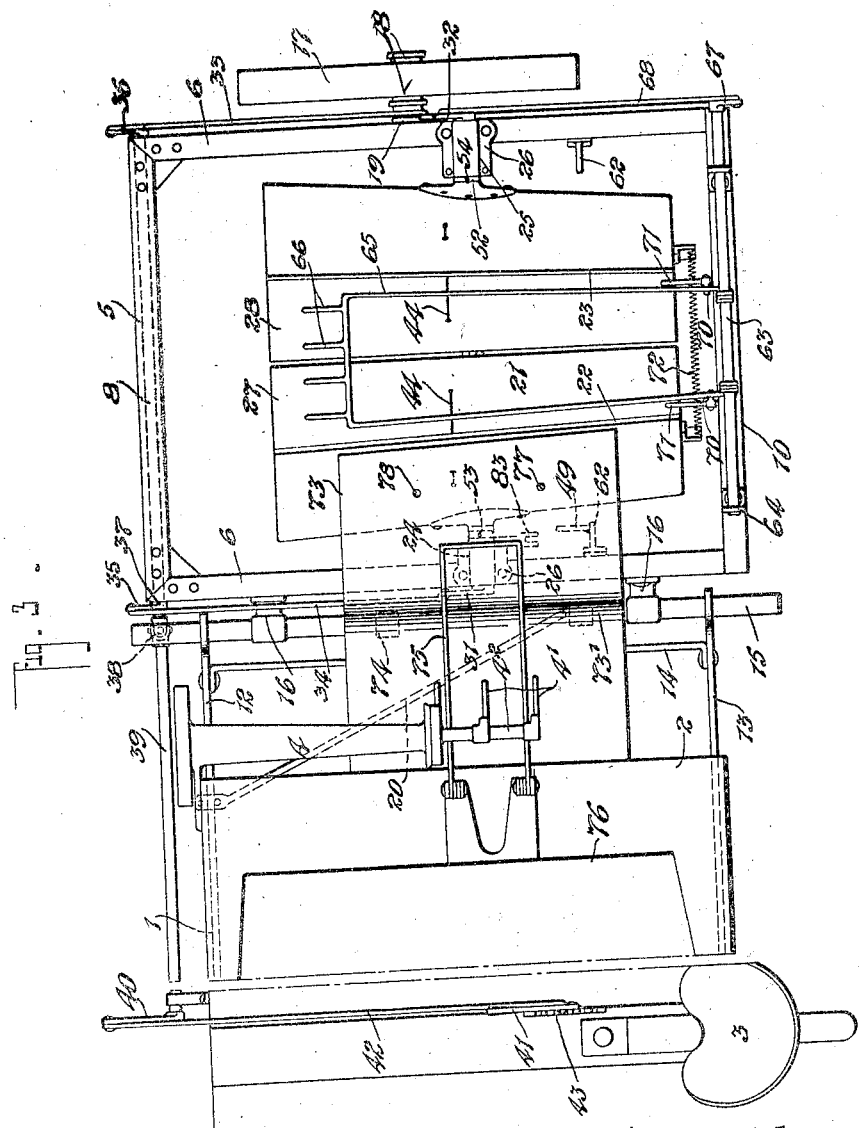

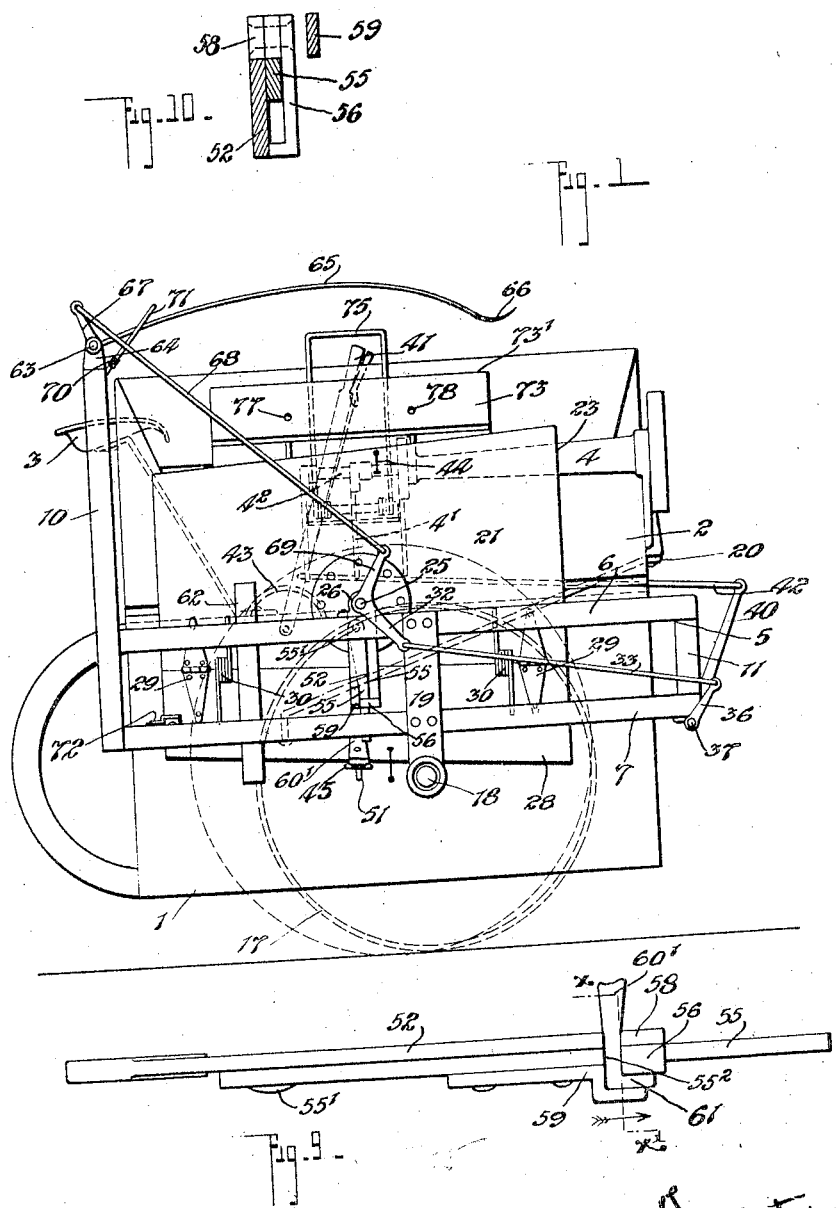

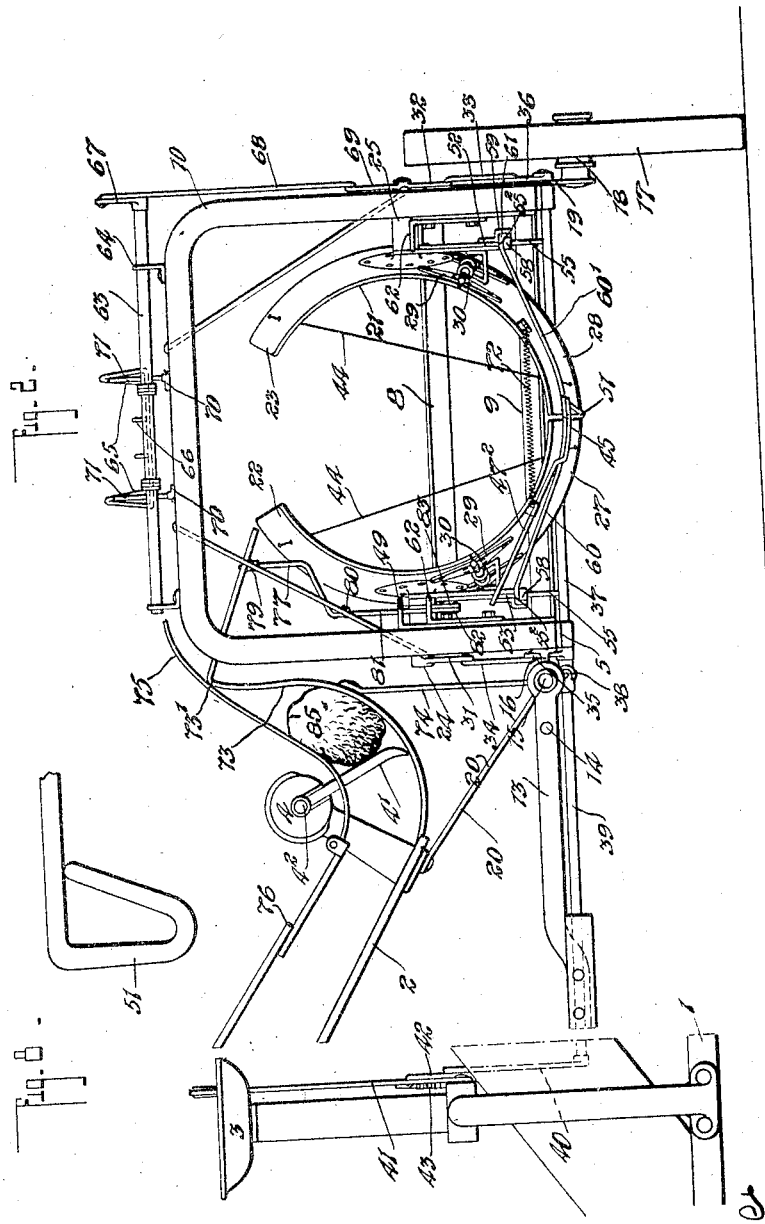

C. W. DAVISON, W. HERRIOT, E. T. SPIDY & F. A. MATTSON.
SHOCKING MACHINE.
APPLICATION FILED MAY 9, 1913.
1,103,273.
Patented July 14, 1914.
4 SHEETS—SHEET 4.
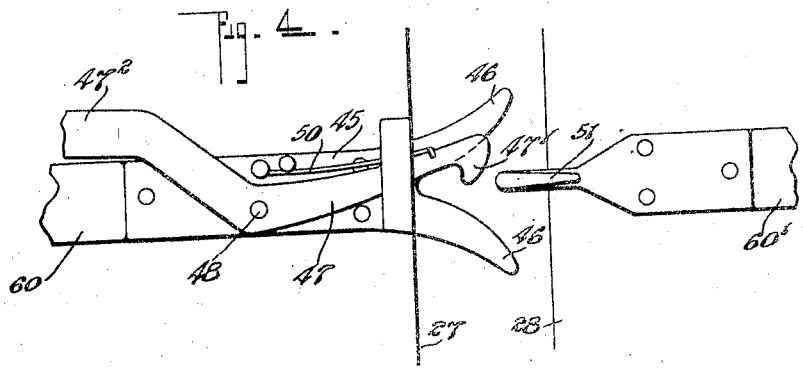
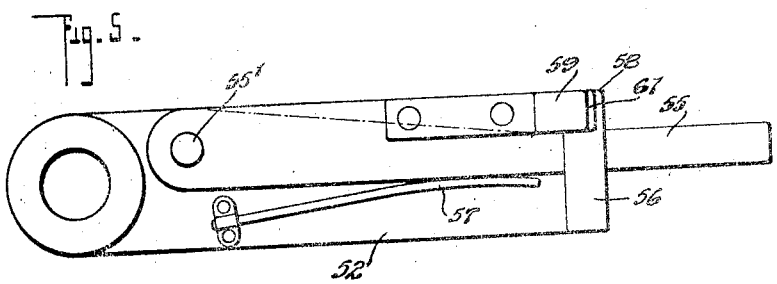
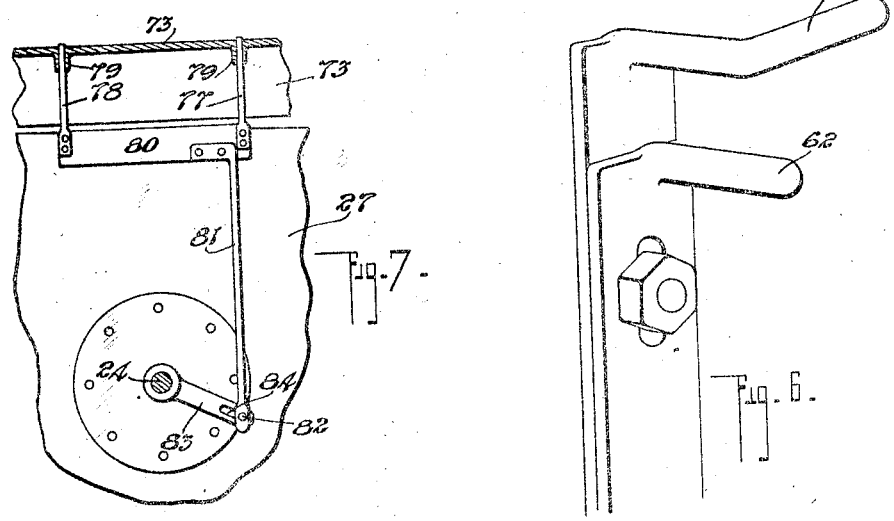
Witnesses
Inventors
C. W. Davison
Wm. Herriot
F. A. Mattson
E. T. Spidy
By their Attorney

UNITED STATES PATENT OFFICE.

CHARLES WILLIAM DAVISON, WILLIAM HERRIOT, EDGAR THOMAS SPIDY, AND FRANK ADDLER MATTSON, OF WINNIPEG, MANITOBA, CANADA.

SHOCKING-MACHINE.

1,103,273.

Specification of Letters Patent. Patented July 14, 1914.

Application filed May 9, 1913. Serial No. 766,582.

*To all whom it may concern:*

Be it known that we, CHARLES WILLIAM DAVISON, WILLIAM HERRIOT, EDGAR THOMAS SPIDY, and FRANK ADDLER MATTSON, all of the city of Winnipeg, in the Province of Manitoba, Canada, have invented certain new and useful Improvements in Shocking-Machines, of which the following is the specification.
The invention relates to an improvement in shocking machines and the object of the invention is to provide a shocking machine attachable to the ordinary binding machine which will receive the sheaves delivered from the binder deck, collect them in the form of a shock and deposit the shock so formed on the ground, such machine being compact, light and easily operated.

A further object of the invention is to provide a shocking machine which can be shifted in respect to the binder frame so that the basket will always receive the sheaves evenly regardless of the length of the sheaves.
A further object of the invention is to provide as a part of the shocking machine an automatically operated device which will arrest and store the sheaves discharged from the binder deck during the interval that the basket is being dumped and returned to the original position and a still further object of the invention is to provide a basket with adjoining attachments which will deposit the sheaves, effect a pressure around the shock in building, spread the butt when dumping and release and deposit the shock on the ground without any tendency to upset the same as the machine advances.

With the above and other objects in view which will become more apparent as the description proceeds the invention consists essentially in an open ended shocking machine frame adjustably secured to the binder at one side and supported by a ground wheel on the opposite side, an open topped sectional sheaf receiving and shock forming basket rotatably mounted in the frame, normally locked hinged and spring pressed gates carried by the basket, means for dumping and for returning the basket to its original position, means for unlocking the gates at a predetermined instant, a pressure arm associated with the basket, pressure rods extending across the basket, a delivery chute adjoining the binder deck and directed to the basket, a pressure bar associated with the basket and arresting forks passing through the delivery chute and operated by the basket, the parts being arranged and constructed as hereinafter more particularly described and later pointed out in the appended claims.

Figure 1 represents a side view of the shocking machine connected to a binding machine. Fig. 2 represents a rear view of the shocking machine and a portion of the binding machine. Fig. 3 represents a plan view of the parts appearing in Fig. 2. Fig. 4 represents an enlarged detailed plan view of a portion of the means employed for locking the gates, and shown in unlocked position. Fig. 5 is an enlarged detailed side view of one of the locking latches and adjoining parts. Fig. 6 is an enlarged detailed perspective view of a pair of the trips utilized for unlocking the basket gates and unlocking the basket brace bars. Fig. 7 is an enlarged detailed side view of the forks and adjoining parts. Fig. 8 is an enlarged detailed side view of the eye forming a portion of the gate lock. Fig. 9 is an enlarged detailed plan view of one of the locking latches and adjoining parts. Fig. 10 is an enlarged detailed vertical sectional view through the locking arm, the section being taken in the plane denoted by the line X—X' Fig. 9.

In the drawings like characters of reference indicate corresponding parts in each figure.

1 represents the binding machine frame, 2 the binder deck, 3 the operator's seat on the binder and 4 the binding attachment which carries discharge arms 4' carried by a rotatably mounted shaft 4² which eject the sheaves passed over the deck.

The above parts form no part of my invention and are not herein described in detail as they are customarily employed on all binders and well known.

It is here considered sufficient for the purposes of the description hereinafter appearing to state that the arms are rotated and controlled by the binder mechanism, their purpose being simply to eject from the deck the sheaf formed by the binder knotter (not shown). It might be well to remark that the arms rotate intermittently, this being also controlled by the binder mechanism. Further it is pointed out for the purpose of the description later appearing that the binding attachment is arranged on all binders at present on the market so that it can be shifted backwardly and forwardly in order to accommodate the knotter, it being always desirable to have the sheaves tied more or less centrally whether the crop be heavy or light.

5 represents a substantially rectangular open ended shocking machine frame which is formed from pairs of side bars 6 and 7 connected forwardly by cross bars 8 and 9 and rearwardly by an arched or yoke-shaped bar 10. The pairs of side bars are fastened permanently together by intervening vertically disposed corner pieces 11.

12 and 13 represent a pair of brackets permanently secured to the binder frame and having their ends extending to the side of the binder beneath the deck where they are spaced by a cross brace 14.

15 is a shaft slidably mounted in the ends of the brackets and 16 are hangers secured permanently to the shaft and to the inner side of the shocking machine frame.

17 is a carriage wheel mounted on a suitable stub shaft 18 carried by a plate 19 permanently secured to the outer side of the shocking machine frame. The carriage wheel and shaft 15 form the support for the shocking machine.

20 represents an adjusting rod having one end thereof secured to the binding attachment and adjustable therewith and the opposite end connected to the shaft 15. This arrangement is provided so that the shocking machine frame will be able to shift forwardly and backwardly with the binding attachment, the shaft 15 sliding in the brackets.

21 represents a sheaf receiving and shock forming basket pivotally mounted in the frame. This basket is now described in detail.

22 and 23 are two similar sections forming the sides of the basket which sections are carried by independent stub shafts 24 and 25 mounted in suitable bearings 26 carried by the shocking machine frame. These sections have their upper edges spaced apart to permit the entrance of the sheaves to the basket and they are curved in vertical section and converge rearwardly as shown. The sections carry gates 27 and 28 which are connected to the lower edges of said sections by strap hinges 29. Springs 30 are connected to the sections and to the gates and tend to hold the gates normally closed so that said gates form in reality a false bottom to the basket.

The basket is held in the horizontal or normal position by cranks 31 and 32 fastened permanently to the ends of the stub shafts and connected with side links 33 and 34 which pass forwardly and are secured to arms 35 and 36 extending from a cross shaft 37 suitably mounted on the front of the shocking machine frame. This shaft is connected through a universal joint 38 or other such like coupling with a further shaft 39 passing across the front of the binder and supplied with a crank 40.

41 is a lever adjoining the seat 3, which lever is connected through a link 42 with the crank 40. The lever is supplied with the usual hand latch and detent, the detent operating over a quadrant 43. By manipulating the lever the attendant can upset or return the basket as desired.

44 is a pair of pressure rods passing through the respective sections and gates and having their ends enlarged to prevent them from escaping.

45 is a guide plate permanently secured to the under side of the gate 27 and having one end thereof forked to provide guides 46.

47 is a dog pivotally secured to the plate by a pivot pin 48 and having one end formed into a catch 47' adjoining the guides and the opposite end formed into a trip rod 47² which extends upwardly to the side of the basket and is designed to engage when the basket is dumped with a trip 49 secured permanently to the inner side of the shocking machine frame. A flat spring 50 is secured to the plate 45 and bears continuously against the back edge of the dog.

51 is an elongated eye secured permanently to the under side of the gate 28 and designed when the gates are closed to pass in between the guides 46 and be locked to the guide plate by the catch of the dog 47.

The parts just described form the lock for the gates, the dog remaining closed in the eye until released by the trip rod engaging with the trip 49.

The trip rod and trip are designed and located so that the trip rod does not engage with the trip until the basket is practically in the upended or dumping position. It is here pointed out that when the lever 41 is pulled toward the seat by the attendant that the forward or large end of the basket is drawn downwardly toward the ground. Accordingly the trip rod will swing upwardly with the basket and engage the trip which is located at a suitable point on the frame behind the stub shaft 24.

52 and 53 are similar downwardly extending locking arms suspended from the stub axles 24 and 25 to which they are permanently fastened by suitable pins 54. These arms are also secured to the basket sections and are reinforced by braces inserted between the basket and the arms. Each arm carries a latch 55 pivotally secured to the same by a pin 55'.

The body of the latch is held slidably by a strap 56 to the arm and it is held normally in a set position by a spring 57 secured to the arm. The free end of each arm is supplied with an offset portion 58 which is arranged so that it is more or less directly opposite the shoulder 55² formed on the latch.

59 is a stop plate secured permanently to the latch and having one end thereof offset and covering, at a point to the side, the opening appearing between the shoulder and the offset portion of the arm.

60 and 60′ are a pair of brace bars having their inner ends permanently secured to the basket gates and their outer ends bent in the form of catches 61 which catches, when the gates are closed and the basket is in the normal position, are designed to pass into the openings between the shoulders of the latches and the offset portions of the arms. They also abut against the stop plates. In this way when the basket is receiving sheaves the brace bars reinforce the gates as they cannot escape from the openings or the stop plates until the latches are thrown down. The outer ends of the latches are designed when the basket is dumped to engage with the trips 62 carried by the shocking machine frame. Immediately the latches hit the trips in the dumping operation they are thrown down and the shoulders are withdrawn as are also the stop plates. The outer ends of the brace bars are then free to move as the gates swing open.

63 is a counter shaft mounted in suitable bearings 64 carried by the yoke-shaped bar 10.

65 is a pressure arm in the form of a loop having the ends thereof permanently secured to the counter shaft and the body portion thereof extending over the opening in the basket.

66 are curved prongs projecting forwardly from the pressure arm.

The counter shaft is supplied with a short crank 67 connected through a link 68 with a second crank 69 extending from the stub shaft 25. This arrangement is such that when the basket is dumped the pressure arm is thrown downwardly through the opening in the basket against the sheaves pressing them tightly into the basket and effecting the spreading of the butt of the shock. The lower position of the pressure arm is limited by adjustable lugs 70 extending laterally from short spindles 71 permanently secured to the bar 10. In actual construction these pressure arms are made from a springy material so that once they hit the lugs they will spring back although the counter shaft may not have reached its final rotated position.

72 is a spiral spring having the ends thereof secured in any suitable way to the rear ends of the gates. This spring assists the springs 30 aforesaid in closing the gates.

73 is a delivery chute continuous with the lower edge of the binder deck. This chute has the lower portion thereof curved or bent concentric to the shaft 4² and the upper portion thereof bent abruptly at 73′ to form a knee and then directed toward the opening in the basket. The chute is supported in any suitable manner such as by brace bars 74 extending from the shocking machine frame.

75 is a curved pressure bar carried by the guard plate 76 of the binder. The pressure bar bears normally against the knee of the delivery chute and it has the upper end thereof extending above the offset portion of the chute for a purpose later described.

77 and 78 are arresting tines protruding through the upper inclined portion of the delivery chute and slidably mounted in bosses 79 provided on the under side of said delivery chute. The tines are connected by a cross plate 80 which carries a downwardly directed bar 81 connected by means of a pin 82 to an arm 83 permanently secured to the stub shaft 24. The pin 82 is received slidably within a slot 84 provided in the arm.

By the above arrangement the tines are extended through the delivery chute each time the basket is dumped and withdrawn every time the basket returns to the normal position. In order to better understand the machine I will now describe its operation assuming the binder advancing and the discharge arms operating to eject the sheaves from the deck. The first sheaf 85 caught by the discharge arms (see Fig. 2) is forced up the delivery chute by the said discharge arms and immediately it reaches the knee is forced by the pressure bar across the upper inclined portion of the delivery chute and into the basket, it being understood that the pressure bar is sprung back by the sheaf as it passes up. The following sheaves are likewise discharged over the knee by the combined action of the discharge arms and pressure bar. When the attendant considers he has enough sheaves in the basket to form a proper shock he draws on the lever 41 and dumps the basket. As the basket dumps the pressure arm 65 draws in through the opening in the basket against the sheaves and forces the sheaves tightly over against the pressure rods 44 which effect a back pressure on the under side of the sheaves. The combined tendency of the pressure arm and the pressure rods is to draw the sheaves together and spread the butts. They also prevent the shock from falling prematurely from the basket. Just previously to the basket assuming the dumped position the locking latches 55 are gaged to hit the trips 62 and so unlock the extending ends of the brace bars. The gates are unlocked by the trip rod 47² engaging with the trip 49. This all occurs before the basket is finally upended and the shock drops from the basket onto the ground. During the interval that the basket is being dumped and returned to the original position the sheaves ejected over the knee by the action of the discharge arms and the pressure bar are arrested and held by the tines 77 and 78 which it will be noticed are designed to pass up through the inclined portion of the delivery chute and arrest the oncoming sheaves immediately the basket begins to dump. They of course are withdrawn when the basket is returned to the initial position. Once the shock is deposited the gates are forced open by it, it being remembered that the machine is at this time advancing. As the basket leaves the shock the pressure rods still have a tendency to crowd in the sides of the shock and prevent it from upsetting. Further it will be noticed that immediately the gates are unlocked and the shock dropped to the ground the pressure arm falls back with the shock and actually prevents the deposited shock from upsetting forwardly as the machine passes away. During this operation the prongs actually ride up the body of the shock and take a position nearer the top of the shock than they occupied the instant the shock was dumped. At the instant the basket is free of the sock the gates spring back under the action of the springs 30 and 72 and automatically lock, the catch 47' passing into the eye 51. Simultaneously the brace bars are locked by the locking latches. The attendant then returns the basket to the original position by forcing the lever forwardly. During this motion the pressure arm returns also to its original position.

What we claim as our invention is:

1. The combination with a suitably supported substantially rectangular open ended frame, of a pair of alined stub shafts rotatably mounted in opposite sides of the frame, independent similar opposing basket forming sections permanently secured to the inner ends of the stub shafts and having their upper and lower edges spaced apart, similar gates hinged to the lower edges of the sections, springs holding the gates normally closed, a spring pressed dog carried by one of the gates and having one end extending to and forming a trip rod, an eye secured to the other of the gates and normally receiving the dog thereby locking the gates closed, means for simultaneously rotating the stub shafts and upending the sections with attached gates and a trip carried by the frame and extending into the path of the trip rod.

2. The combination with a suitably supported substantially rectangular open ended frame of a pair of alined stub shafts rotatably mounted in opposite sides of the frame, independent similar opposing basket forming sections permanently secured to the inner ends of the stub shafts and having their upper and lower edges spaced apart, similar gates hinged to the lower edges of the sections, springs holding the gates normally closed, a spring pressed dog carried by one of the gates and having one end extending and forming a trip rod, an eye secured to the other of the gates and normally receiving the dog thereby locking the gates closed, a pair of cranks secured to the outer ends of the stub shafts, a cross shaft rotatably mounted in the front of the frame, arms extending from the cross shaft, side links connecting the arms with the cranks, means for rotating the cross shaft and thereby upsetting the sections and attached gates and a trip carried by the frame and extending into the path of the trip rod.

3. The combination with a suitably supported substantially rectangular open ended frame, a yoke bar carried by the frame and spanning the open end thereof, a normally horizontally disposed sheaf receiving and shock forming basket rotatably mounted in the frame and having an open top and means for dumping the basket and returning the same to the original position, of a counter shaft rotatably mounted on the yoke-bar, a pressure arm carried by the counter shaft and normally overhanging the basket and directly above the opening therein and means actuated by the dumping means for operating the counter shaft and passing the pressure arm into the basket through the opening during the dumping operation, as and for the purpose specified.

4. The combination with a suitably supported substantially rectangular open ended frame, a yoke bar secured to the frame and spanning the open end thereof, stub shafts rotatably mounted in the sides of the frame, a normally horizontally disposed sheaf receiving and shock forming basket carried by the stub shafts and having an open top and means for rotating the stub shafts to dump and return the basket to the original position, of a counter shaft rotatably mounted on the yoke-bar, a crank extending from one of the stub shafts, a crank secured to one end of the counter shaft, a link connecting the cranks, a pressure arm secured to the counter shaft and normally overhanging the basket directly above the opening and adjustable lugs carried by the yoke bar and engageable with the pressure arm, as and for the purpose specified.

5. The combination with a suitably supported rotatably mounted sheaf receiving and shock forming basket having an open top and provided on the under side with a pair of normally locked gates, of a pair of vertically disposed downwardly converging pressure rods passing through the sides of the basket and through the gates and located more or less centrally of the length of said basket, said rods having their ends enlarged to prevent their escape from the basket, as and for the purpose specified.

6. The combination with a rotatably mounted sheaf receiving and shock forming basket having an open top and provided on the under side with a pair of normally locked gates, means for dumping the basket and returning the same to the original position and means for unlocking the gates during the dumping operation, of a pair of normally downwardly extending arms secured to the sides of the basket, a pair of brace bars secured permanently to the gates and extending toward the arms, releasable means normally locking the outer ends of the brace bars to the arms and trip means for releasing the latter locking means during the dumping operation and prior to the unlocking of the gates, as and for the purpose specified.

7. The combination with a suitably supported frame, stub shafts rotatably mounted on the frame, a normally horizontally disposed sheaf receiving and shock forming basket carried by the shafts, said basket having an open top, means for dumping the basket and for returning the same to the original position and a suitably supported delivery chute adjoining the basket and directed toward the opening in the top thereof, of arresting tines protruding through the chute and slidably mounted in bosses provided on the under side of said chute, a cross plate connecting the tines, an arm secured permanently to one of the stub shafts and having the extending end thereof slotted, a vertically disposed bar secured to the plate and a pin secured to the lower end of the bar and operating in the slot, as and for the purpose specified.

Signed at Winnipeg this 10th day of April 1913.

CHARLES WILLIAM DAVISON.
WILLIAM HERRIOT.
EDGAR THOMAS SPIDY.
FRANK ADDLER MATTSON.

In the presence of—
G. S. ROXBURGH,
ROLAND FOSTER.